United States Patent
Killoran, Jr.

(10) Patent No.: US 10,169,805 B2
(45) Date of Patent: *Jan. 1, 2019

(54) SYSTEM AND METHOD FOR SELECTIVELY PROVIDING USER DETERMINED OFFERS

(71) Applicant: @PAY IP Holdings LLC, Wilmington, DE (US)

(72) Inventor: John P. Killoran, Jr., Albuquerque, NM (US)

(73) Assignee: SWOOP IP HOLDINGS LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/675,247

(22) Filed: Aug. 11, 2017

(65) Prior Publication Data

US 2017/0337615 A1    Nov. 23, 2017

Related U.S. Application Data

(63) Continuation of application No. 13/457,073, filed on Apr. 26, 2012, now Pat. No. 9,734,530.

(60) Provisional application No. 61/524,898, filed on Aug. 18, 2011.

(51) Int. Cl.
G06Q 30/00 (2012.01)
G06Q 30/06 (2012.01)

(52) U.S. Cl.
CPC ..... *G06Q 30/0631* (2013.01); *G06Q 30/0621* (2013.01)

(58) Field of Classification Search
CPC ........... G06Q 30/0601; G06Q 30/0631; G06Q 30/0253; G06Q 30/0633
USPC ................................ 705/26.1, 27.1
See application file for complete search history.

(56) References Cited

U.S. PATENT DOCUMENTS

| | | | |
|---|---|---|---|
| 5,426,781 A | 6/1995 | Kaplan et al. |
| 5,664,110 A | 9/1997 | Green et al. |
| 5,694,546 A | 12/1997 | Reisman |
| 5,706,442 A | 1/1998 | Anderson et al. |

(Continued)

FOREIGN PATENT DOCUMENTS

WO    2006/119342 A2    11/2006

OTHER PUBLICATIONS

Truxa, Ivo, MIVA® Merchant: MmPGP Secure PGP Email Merchant Notification Module, http://mivo.truxoft.com/mm0001.htm, Jan. 21, 2011, pp. 1-10.

(Continued)

*Primary Examiner* — Brandy A Zukanovich
(74) *Attorney, Agent, or Firm* — Volpe and Koenig, P.C.

(57) ABSTRACT

A system and method for creating a watchlist of products relating to any type of item/service/event for which any type of purchase may be made by a user. The system permits a user to access a website and identify items of the website that are of interest and other users (or friends) and associate one or more users with one or more items in the watchlist. The system stores the identified items and friends in a watchlist for later retrieval, review, transmission or action by the user. The system may periodically inform the user of any changes to the items of interest or any changes in purchases made by the users friends to items in the watchlist. Items may alternatively be added from multiple websites, multiple emails or automatically by the system.

6 Claims, 10 Drawing Sheets

(56) References Cited

U.S. PATENT DOCUMENTS

| | | |
|---|---|---|
| 5,710,887 A | 1/1998 | Chelliea et al. |
| 5,758,328 A | 5/1998 | Giovannoli |
| 5,793,972 A | 8/1998 | Shane |
| 5,794,206 A | 8/1998 | Wilkinson et al. |
| 5,799,157 A | 8/1998 | Escallon |
| 5,809,242 A | 9/1998 | Shaw et al. |
| 5,825,881 A | 10/1998 | Colvin, Sr. |
| 5,826,242 A | 10/1998 | Montulli |
| 5,826,269 A | 10/1998 | Hussey |
| 5,838,790 A | 11/1998 | McAuliffe et al. |
| 5,848,397 A | 12/1998 | Marsh et al. |
| 5,855,008 A | 12/1998 | Goldhaber et al. |
| 5,864,823 A | 1/1999 | Levitan |
| 5,870,717 A | 2/1999 | Wiecha |
| 5,890,138 A | 3/1999 | Godin et al. |
| 5,897,622 A | 4/1999 | Blinn et al. |
| 5,899,980 A | 5/1999 | Wilf et al. |
| 5,905,973 A | 5/1999 | Yonezawa et al. |
| 5,970,469 A | 10/1999 | Scroggie et al. |
| 6,101,485 A | 8/2000 | Fortenberry et al. |
| 6,246,996 B1 | 6/2001 | Stein et al. |
| 6,690,407 B1 | 2/2004 | Parker |
| 6,938,048 B1 | 8/2005 | Jilk et al. |
| 6,954,737 B2 | 10/2005 | Kalantar et al. |
| 6,993,559 B2 | 1/2006 | Jilk et al. |
| 7,533,064 B1 | 5/2009 | Boesch |
| 7,577,587 B2 | 8/2009 | Gee |
| 7,912,910 B2 | 3/2011 | Banerjee et al. |
| 8,156,012 B1 | 4/2012 | Eisner et al. |
| 2002/0010746 A1 | 1/2002 | Jilk et al. |
| 2002/0065828 A1 | 5/2002 | Goodspeed |
| 2002/0103752 A1 | 8/2002 | Berger et al. |
| 2002/0120581 A1 | 8/2002 | Schiavone et al. |
| 2002/0152200 A1 | 10/2002 | Krichilsky et al. |
| 2002/0178360 A1 | 11/2002 | Wenocur et al. |
| 2003/0182263 A1 | 9/2003 | Augustine et al. |
| 2003/0217107 A1 | 11/2003 | Parry |
| 2004/0024655 A1 | 2/2004 | Estes |
| 2005/0044003 A1 | 2/2005 | O'Keeffe et al. |
| 2005/0160038 A1 | 7/2005 | Albornoz |
| 2005/0251460 A1 | 11/2005 | Quigley |
| 2007/0022007 A1 | 1/2007 | Lawe |
| 2009/0254447 A1 | 10/2009 | Blades |
| 2009/0276345 A1 | 11/2009 | Hughes |
| 2009/0327126 A1 | 12/2009 | Schoenberg et al. |
| 2010/0010886 A1 | 1/2010 | Flynn, Jr. |
| 2010/0049631 A1 | 2/2010 | Goldman |
| 2010/0131523 A1 | 5/2010 | Yu et al. |
| 2011/0202615 A1 | 8/2011 | Fletcher |
| 2011/0264555 A1* | 10/2011 | Turner-Rielle ........ G06Q 30/06 705/26.8 |
| 2011/0295749 A1 | 12/2011 | Scalisi |
| 2012/0109781 A1* | 5/2012 | Felt .................... G06Q 30/0601 705/26.41 |
| 2012/0215603 A1 | 8/2012 | Pivato et al. |
| 2012/0276868 A1 | 11/2012 | Martell |

OTHER PUBLICATIONS

Shiraki, T; Kokudo, J; Ono, Y; Kashiwagi, To, "network advertisement delivery system," retreived from ProQuest.

Anonymous, "Easier access to Edgar," Fund Action, May 17, 1999, 10(20), 8.

* cited by examiner

FIG. 4

WATCHLIST

| WEBSITE | ITEM | PRICE | ADD DATE | CHANGES | |
|---|---|---|---|---|---|
| 📊 | Retailer Name<br>MOVIE THE HUNGER GAMES | $12.00 | 12/22/12 | — | BUY<br>DELETE |
| 📊 | Retailer Name<br>BRUCE SPRINGSTEEN CONCERT | $120 | 3/7/12 | — | BUY<br>DELETE |
| 📊 | Retailer Name<br>CRUISE TO ALASKA | $12,000 | 2/26/12 | — | BUY<br>DELETE |
| 📊 | ... | ... | ... | | |

[500]

[502] EXIT WEBSITE
[504] RESUME SHOPPING

*FIG. 5*

WATCHLIST

| WEBSITE | ITEM | PRICE | ADD DATE | CHANGES | |
|---|---|---|---|---|---|
| | MOVIE THE HUNGER GAMES<br>Retailer Name | ~~$12.00~~<br>$10.00 | 12/22/12 | NEW PRICE! | BUY<br>DELETE |
| | BRUCE SPRINGSTEEN CONCERT<br>Retailer Name | $120 | 3/7/12 | BACK STAGE PASSES | BUY<br>DELETE |
| | CRUISE TO ALASKA<br>Retailer Name | $12,000 | 2/26/12 | — | BUY<br>DELETE |
| | ... | ... | ... | | |

706 → (price field)
500 (watchlist)

EXIT WEBSITE — 502
RESUME SHOPPING — 504

*FIG. 7*

SYSTEM AND METHOD FOR SELECTIVELY PROVIDING USER DETERMINED OFFERS

CROSS REFERENCE TO RELATED APPLICATION

This application is a continuation of U.S. patent application Ser. No. 13/457,073 filed on Apr. 26, 2012, which claims the benefit of U.S. Provisional Application No. 61/524,898 filed on Aug. 18, 2011, which are incorporated by reference as if fully set forth.

BACKGROUND

The internet has brought unprecedented amounts of information to the fingertips of potential consumers across the globe. As the quality of search engine algorithms has continued to improve, it has been easier for consumers to receive search results that are closer to their expectations. Accordingly, access to large volumes of information has provided many benefits to consumers who make purchases via the internet, such as providing a more solid foundation upon which consumers may base purchasing decisions.

There has been no greater effect by the internet on preexisting businesses than that on retail sales and their business models. Consumers were once relegated to searching physical stores within the vicinity of their homes. Consumers now have access to retail and virtual stores around the globe, and can compare and contrast products, prices and information regarding all manner of products and services from those retailers. This has given shoppers unparalleled power to shop for the best price and the specific product for which they are looking.

However, there has been a downside to this proliferation of information. There are now so many retail websites, with so much information on each website, that the shopping experience has begun lead to information overload and shopping fatigue. It becomes difficult for consumers to keep track of which website(s) on which they have found a particular item, or which items on a particular website they have been interested. The consumer has become frustrated, and the shopping experience is greatly diminished as a result.

The designers of retail websites understand this frustration and have instituted measures to help consumers in this regard. Most retail websites now allow a user to put things in a "shopping cart" for later purchase, or even permit a consumers to create a list of items in which they are interested, a consumers has to establish the shopping cart or list for each website. This typically includes logging in to each website and entering personal information. This process is inconvenient and time-consuming for the consumers and becomes yet another source of frustration. Additionally, certain items, such as tickets to events such as a concert, play or movie may not be currently available when the consumer happens to be shopping or a consumer may not be ready to buy while at the website and between the time they decide to make the purchase and log back on to the website the item of interest may be sold out.

A method and apparatus for providing items such as tickets to various types of events without the limitations of the prior art is greatly needed.

SUMMARY

A system and method for creating a watchlist of products relating to any type of item/service/event for which any type of purchase may be made by a user. The system permits a user to access a website and identify items of the website that are of interest and other users (or friends) and associate one or more users with one or more items in the watchlist. The system stores the identified items and friends in a watchlist for later retrieval, review, transmission or action by the user. The system may periodically inform the user of any changes to the items of interest or any changes in purchases made by the users friends to items in the watchlist. Items may alternatively be added from multiple websites, multiple emails or automatically by the system.

BRIEF DESCRIPTION OF THE DRAWINGS

A more detailed understanding may be had from the following description, given by way of example in conjunction with the accompanying drawings wherein:

FIG. 4 shows an item as added to a watchlist;

FIG. 5 shows a plurality of items added to the watchlist of FIG. 4;

FIG. 7 shows an updated watchlist of FIG. 4 as transmitted to a user showing any updates that were made since the last transmission of the watchlist;

DETAILED DESCRIPTION

Figure 1:
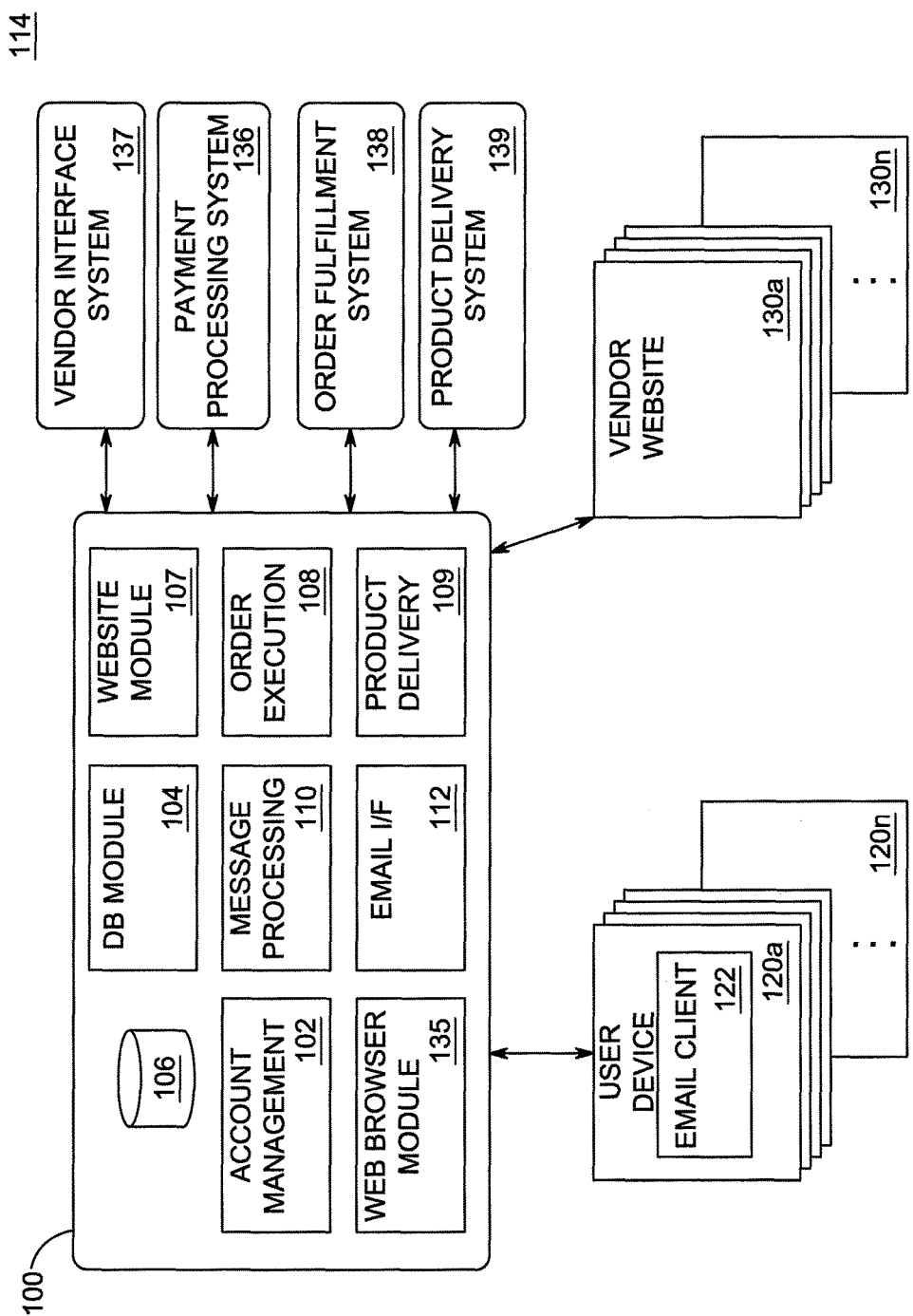
FIG. 1 shows a block diagram of a system architecture for creating a watchlist in accordance with the present invention.

FIG. 1 shows an example logical architecture 114 for email-based e-commerce. The example architecture 114 includes an e-commerce system 100, a payment processing system 136, a vendor interface system 137, a vendor order fulfillment system 138, and a product delivery system 139, and may interface with a plurality of user devices 120a-120n and a plurality of vendor websites 130a-130n.

The e-commerce system 100 may include an account management module 102, a database module 104, an e-commerce database 106, a website module 107, an order execution module 108, a product delivery module 109, a message processing module 110, a web browser module 135 and an email interface module 112.

Although not explicitly shown in FIG. 1 for simplicity, these modules may be functionally linked together. As those of skill in the art would appreciate, the modules may be embodied as physical units that are physically linked together via one or more electronic bus structures, may be functional units that are functionally linked together vial one or more communication protocols, or there may be a combination of physical or functional units. They may be programmed via software or firmware in a plurality of physically separate units, or may be incorporated into a single programmable unit. Accordingly, although the present invention may be described herein as distinct and specific units or modules, (such as, for example the vendor interface system 137, the payment processing system 136, the order fulfillment system 138 and the product delivery system 139), this is for convenience of explanation, and these modules, systems or units may be variously combined into one or a plurality of units without departing from the spirit and scope of the present invention. Additionally, the various functionality described herein relating to watchlists may be implemented using any one or more of the components mentioned as part of the e-commerce system 100 or using any type of processor or processors, any type of single programmable unit/processor, or any type of module and may be configured as a component of the e-commerce system 100 or as a component in communication with the e-commerce system 100.

As will be described in further detail hereinafter, the e-commerce system 100 and user devices 120a-120n may communicate to initiate and manage transactions such the searching, processing, tracking and purchase of various items. As will also be described in further detail hereinafter, the e-commerce system 100 may communicate with the payment processing system 136, the vendor interface system 137, the vendor order fulfillment system 138 and the product delivery system 139 to execute the transactions.

The account management module 102 may manage data related to accounts for users and vendors that participate in commerce via the e-commerce system 100. The account management module 102 may be or include, for example, a web application.

Vendors may interact with the account management module 102 via the vendor interface system 137, which may comprise a web browser or a proprietary closed system. As one example, a vendor may provide information via the vendor interface system 137 to the account management module 102 such as: product and pricing information to be used for email advertisements to be sent to users in email campaigns; periodic and/or aperiodic updates regarding product and pricing information to be sent to users as selected by the users; email formatting information for email advertisements to be sent to users; financial information related to bank accounts and/or other types of financial accounts (such as e-payment accounts such as PayPal accounts) for receiving payments from users of the e-commerce system 100, such as account numbers and/or other identifying information; and/or other information. The vendors may include any type or number of vendors involved in the offering for sale items such as movie tickets, spa services, theatre events, cruises, sporting events, concerts, airline tickets, hotel reservations, etc. to name a few purely by way of example. The vendors may offer any type of item/service/event for which any type of advance purchase may be made by a user.

Users may interact with the account management module 102 via the web browser module 135. The web browser module 135 provides functionality for user access to the e-commerce system 100. Users may register with the e-commerce system 100 by interacting with the web browser module via their web browser. The web browser module 135, in turn, interfaces with the account management module 102. This permits the account management module 102 and the web browser module 135 to support individualized functionality for each user. It should be noted that the web browser module 135 and the vendor interface system may comprise a single module.

As will be described in detail hereinafter, the account management module 102 may track the shopping trends or statistics of the user including items browsed, items put on a watch list and/or items that were eventually purchased either for the user or as gifts for other people. Where a user is a travel agent professional, for example, the user may configure the account management module to track shopping trends or statistics on a customer-by-customer basis. The trends or statistics may include length of time that a user spends on in item or certain category of items, the number of "clicks" on an item or certain category of items, (such as reviewing other user reviews, comparing several items or the like), the amount of time spent on viewing the item or type of item, or the number of times a user "returns" to an item or type of item during one or more shopping experiences. This allows the tracking and statistical determination of the likes and dislikes of each user. The account management module 102 may retain certain information regarding each user that the user directly inputs; for example, in response to one, or a series of website product questionnaires or surveys. All of this user-specific information is collected and stored.

A user of the user client device 120 may provide information to the account management module 102 via the web browser module 135 such as: an email address associated with the user; financial information associated with the user, such as a credit card information (such as a credit card number and expiration date), and/or other information related to bank accounts and/or other types of financial accounts (such as e-payment accounts) that may be used to make payments to vendors via the e-commerce system 100; shipping address information; billing address information; preferences regarding which vendors the user would like to receive email advertisements from; and/or other information.

In a separate embodiment, the financial information of a user, such as credit card information, may be supplied to the account management module 102 for analysis of user preferences. This permits the account management module 102 to analyze all of the information for user preferences and to suggest items in which the user may be interested. These suggestions may be emailed to the user for adding to a watchlist as will be described in detail hereinafter.

The account management module 102 may, via the database module 104, store information received from the user device 120 and/or the vendor website 130a-130n in the e-commerce database 106. The account management module 102 may also add information to the e-commerce database 106 when users and vendors register with the e-commerce system 100. This information may include as user identifiers, vendor identifiers, and other identifying information.

The message processing module 110, (in conjunction with the email interface module 112), may generate advertisement or product update email messages for users that are registered with the e-commerce system 100, such as the users of the user devices 120a-120n. The advertisement or product update email messages may be HyperText Markup Language (HTML) email messages, Rich Text Format (RTF) email messages, and/or may be defined according to any other appropriate format. The advertisement or product update email messages may include Uniform Resource Identifiers (URIs) or hyperlinks that are defined according to the mailto URI scheme. Each mailto URI or hyperlink may describe an email message that may be generated by an email client module (such as the email client module 122) when that URI or hyperlink is selected.

The generated message may include a number of parameters that indicate, for example, an item that was advertised in the advertisement email that the user wishes to purchase or reserve for future purchase when the item becomes available. In the context of movie tickets, for example, the generated message may include an advertisement indicating that a particular movie is coming to theaters in a few weeks and that tickets are going on sale today. The generated message may alternatively include a number of parameters that indicate, for example, updated information regarding a product that a user has been tracking for possible future purchase. The generated message may then be sent from the e-commerce system 100 to users from the email interface module 112. By way of further example, again in the context of movie tickets, the email may include information indicating that the available number of tickets for a movie at a particular location, date, and/or time are becoming low and providing the option to purchase immediately.

The email interface module 112 may be configured to use one or more email accounts that are associated with the e-commerce system 100, and to send and receive messages associated with the one or more email accounts. The email interface module 112 and/or the email client module 122 in the user client device 120 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other appropriate technologies. The interface module 112 and/or the email client module 122 may use these technologies to transmit and/or receive email messages via one or more email servers (not depicted).

The email client module 122 may be, or include, an email client such as Microsoft Outlook, Thunderbird, a web browser application, or any other client application for the communication of email messages. In an instance where the email client module 122 is or includes a web browser application, the email client module 122 may be the same web browser described above that may be used to communicate with the account management module 102; alternatively the email client module 122 and the web browser described above that may be used to communicate with the account management module 102 may be different. As will be described in detail hereinafter, the user, through the email client 122 on the user device 120a, may take one or more actions, such as replying to the email, selecting one or more reply-to links in the email, adding one or more items from the email to a watchlist or the like.

The payment processing system 136 handles financial transactions associated with the purchase of an item or service, or a donation. The payment processing system 136 may be, as one example, a payment gateway operated by a financial institution. In an instance where the payment processing system 136 is a payment gateway, the payment processing system 136 may have a connection to one or more banking networks (not depicted) that it may use to process payments. The order execution module 108 may communicate with the payment processing system 136 using technology such as Transport Layer Security (TLS) or Secure Sockets Layer (SSL) technology. The vendor order fulfillment system 138 may be an order management system (OMS), Enterprise Resource Planning (ERP), supply chain management, electronic purchasing system, inventory control system, or any other appropriate system for fulfilling orders.

The e-commerce database 106 may store information such as information that describes and/or comprises email campaigns, email advertisements that may be sent to users, user information, vendor information, product information, product information updates and history, product availability information, order status information, and/or other information. Further, the e-commerce database 106 may store information that indicates correspondences between different email campaigns, advertisements, users, vendors, products, information related to order statuses, and/or other information. For each email campaign, the e-commerce database 106 may store information that include an identifier of the vendor associated with the campaign, identifiers of the products associated with the campaign, and/or other information. For each order that is placed with the e-commerce system 100, the e-commerce database 106 may store information such as an identifier of the user that placed the order, when the order was placed, an identifier of the vendor associated with the order, and/or other information.

For each product described in the e-commerce database 106, the e-commerce database 106 may store information that includes an identifier of the product, a description of the product, a title of the product, an identifier of the vendor associated with the product, a cost of the product, an available number of tickets for the user to avail themselves of the product, potential upgrades/downgrades to the product (e.g. in the airline ticket context first class and coach class pricing options may be provided, a date on which the product is available (e.g. concert tickets at this price are for attending the concert between date X and Y), a date on which tickets for a particular product are available for purchase, a date on which tickets for a particular product are available to be reserved, and/or other information.

The e-commerce database 106 may be spread across one or any number of computer-readable storage media (not depicted). For example, a portion of the e-commerce database may reside on a vendor's website and may be accessed through the vendor interface system 137. The e-commerce database 106 may be or include, for example, a relational database, a hierarchical database, an object-oriented database, a flat file, a spreadsheet, or a structured file. The database module 104 may interface with a database management system (not depicted) in order to add data to, modify data in, or obtain data from the e-commerce database 106. Alternatively or additionally, the database module 104 may perform database driver and/or database client functionality to interact with the database management system. The database management system may be based on a technology such as Microsoft SQL Server, Microsoft Access, MySQL, PostgreSQL, Oracle Relational Database Management System (RDBMS), Not Only SQL (NoSQL), or any other appropriate technology.

The website module 107 provides all of the functionality to support a working website. These functions include displaying a plurality of web pages to a user and providing the standard functionality of a webpage such as graphics and video, links to different parts of the website, user login and authentication, support for purchases, security features and an interface to user support. The website module 107 provides the graphical interface and user experience to the web user, and supports the functionality as will be described in detail hereinafter.

Figure 2:
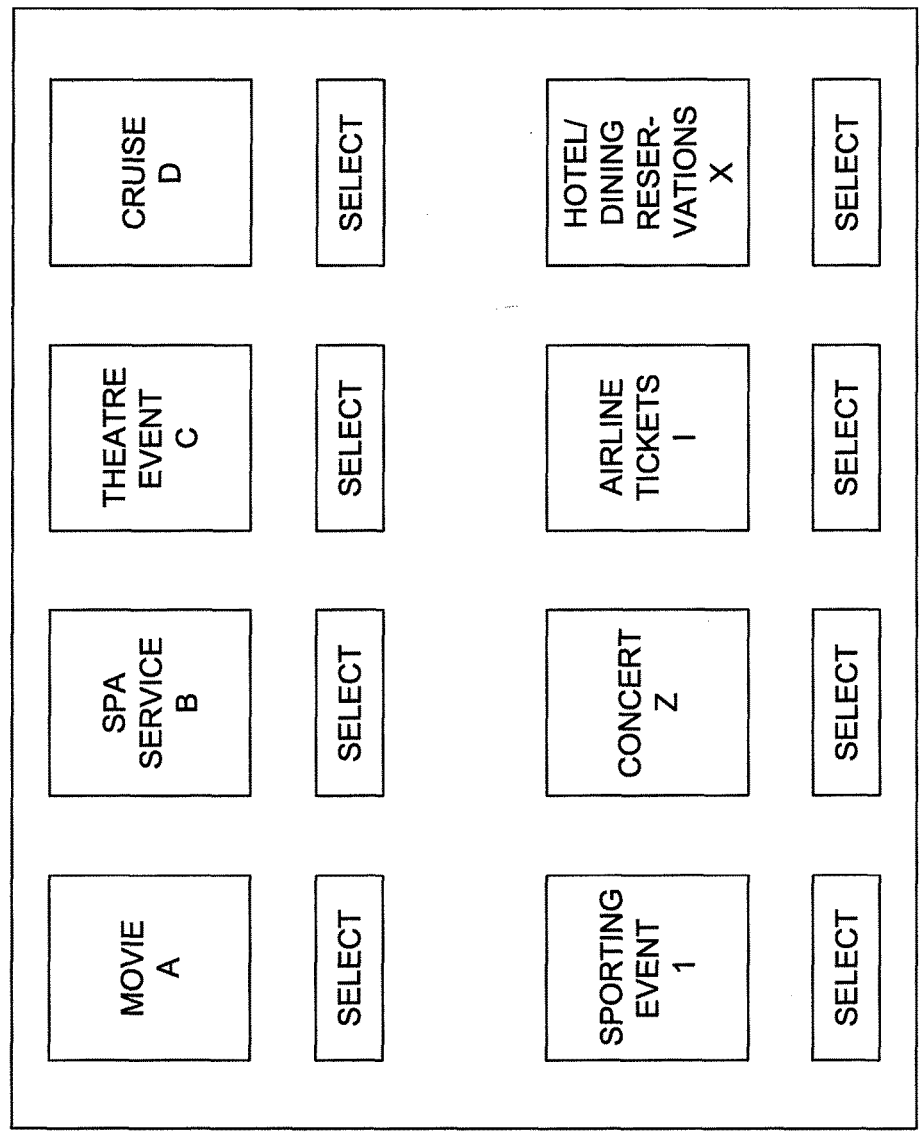
FIG. 2 shows a plurality of events for which tickets may be purchased on a retail website.

FIG. 2 shows a website displaying a plurality of example products for which tickets may be purchased. The products shown by example in the website of FIG. 2 are not at all limiting as the products may be any type of item/service/event for which any type of purchase may be made by a user. Each product is associated with a plurality of attributes, (which are not shown in FIG. 2). The attributes may any type of data related to a particular product. For example the attributes may include one or more words, numbers or other identifiers that may be used to describe, or may be associated with, the item. In one example, in the context of a sporting event, the attributes may include stadium location, identities of the participating teams and/or individuals competing in the sporting event, identification of seat location, date/time of the sporting event, price, etc. As those of skill in the art would understand, there may also be many attributes associated with each consumer item that are not intended for the users to utilize, but rather they are for the website proprietor or vendors to utilize. Any, or all, of these attributes may be used for tracking and evaluation.

For example, a "program" attribute may be used by a vendor to track the success of a vendor's current promotional effort to sell out a particular concert, or movie showing or sporting event. Such information may be used to measure the vendor's success with the same products offered in different cites (i.e. Chicago versus Philadelphia) and/or as measured against different vendors selling the same products.

By further example, a "linking" attribute may be used by the website proprietor to track the success of their effort to "upsell" to the user, for example from a less expensive option (e.g. back row seating) to a more expensive item (e.g. front row seating), or to have the user buy accessories to the item that the user has selected (e.g. users attending a Bruce Springsteen concert may be offered various types of memorabilia). These attributes will be described in greater detail hereinafter.

Referring back to FIG. 2, the user may browse through the items, comparing features among different items. Having looked at all of the attributes, the user may view a particular item and, concluding that this item is the item they were looking for, select the item, (such as hotel reservations in San Diego at the Grand Hyatt). They may select the item as indicated by placing the cursor over the picture of the item or the select button and clicking on it. The selection chosen for purposes of describing this example is a movie entitled The Hunger Games.

Figure 3:
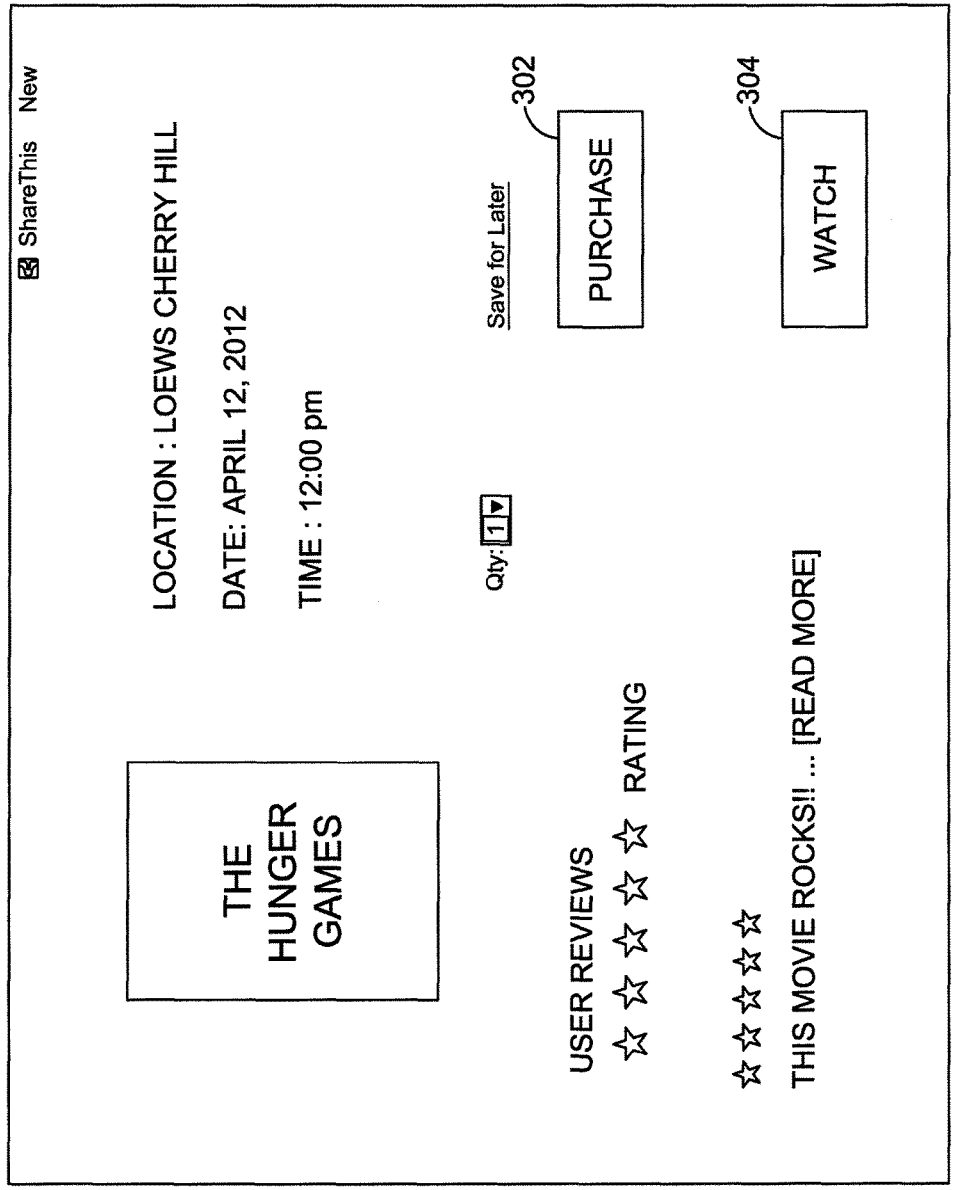
FIG. 3 shows one of the plurality of events for which tickets may be purchased on the retail website with a button permitting the user to add the item to a watchlist.

This selection brings the user to another web page with more detailed information regarding the item as shown in FIG. 3. For example, the user may read other user reviews, see the current price, and review the location, date and times that are available. However, the user may not yet be ready to commit to location, date and/or time or the currently available locations, dates, and/or times may not work within the user's schedule. Accordingly, instead of putting the item into their shopping basket and proceeding through to purchase, the user may select the watch list button, indicated in FIG. 3 as "Watch".

Figure 4:
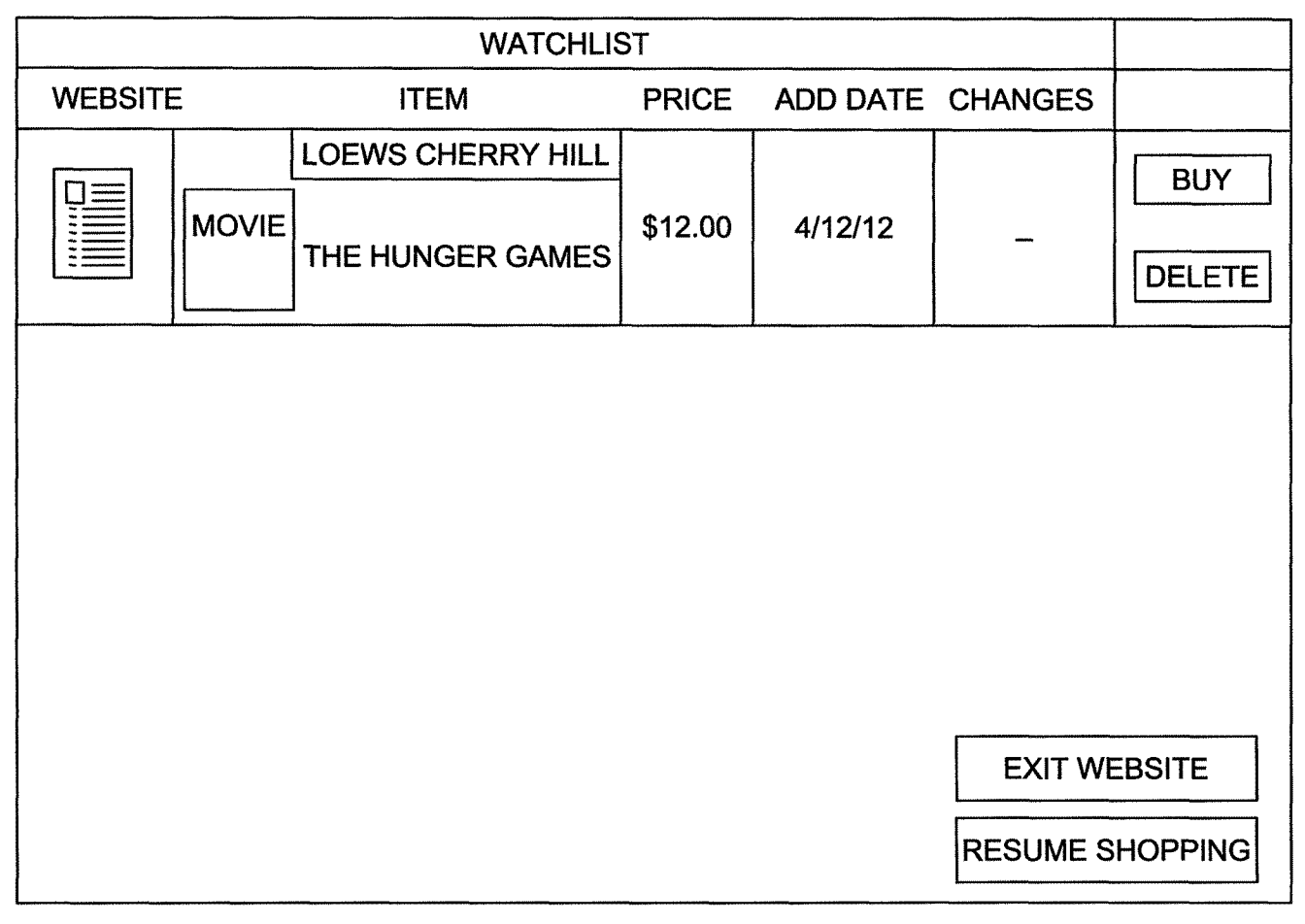

Selection to put the item on the watch list opens the user's watch list, which is shown in FIG. 4. The watchlist keeps track of the item and all of the relevant associated information at the time of selection by the user. It should be noted that the amount and type of information that is displayed on the watchlist is configurable by the user. Therefore, more or less information as desired by the user may be displayed or stored. In the example shown in FIG. 4, the picture, the manufacturer, the type, the price and the watchlist add date are all stored. The user may create a more extensive watch list by repeating the method described with reference to FIGS. 2-4 and adding more items. This more extensive watch list is shown in FIG. 5 by way of example.

Referring to FIG. 5 additional items are shown that the user has put on the watchlist, including a Bruce Springsteen concert and a cruise to Alaska. All of these items and their associated information are stored for later use by the user or the vendor as will be described in detail hereinafter. The user may exit the website by selecting the "Exit Website" button, or my resume shopping by selecting the "Resume Shopping" button.

Figure 6:
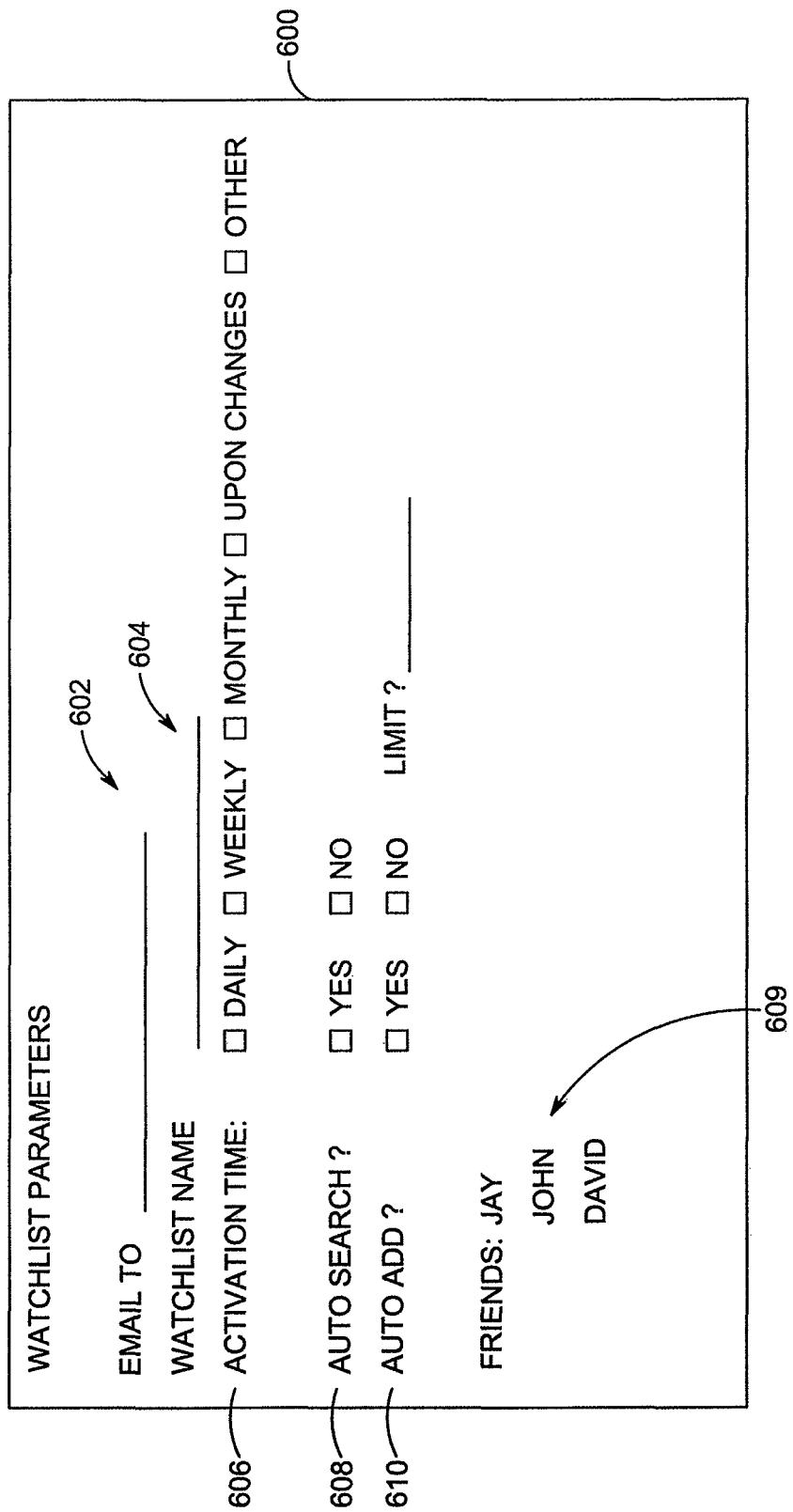
FIG. 6 shows a watchlist parameter configuration screen.

In another embodiment, the first time that a user creates a watch list, they may be taken to a "watchlist parameter" screen as shown in FIG. 6. This screen permits the user to configure the features of the watchlist to suit their needs. The user must first enter the email address to which they want the watchlist to be sent. Alternatively, the system 100 may "remember" the users website, and autofill that particular email address (and the remainder of this information to be described herein with reference to FIG. 6). Next, the user selects the frequency that they want to watchlist to be emailed, for example hourly, daily, weekly monthly or upon changes. Once a watch list is generated, for example the one shown is FIG. 5, it may be stored in stored in the e-commerce database 106. As will be discussed in greater detail hereinafter, the system 100 uses the watch list, and optionally the user's preferences, to generate an active watch list.

Still referring to FIG. 6, the e-commerce system 100 may also be configured to enable a user or the system operator to configure a user watchlist to include a list of friends 609 of the user who also are associated with the e-commerce system 100 or who otherwise have granted permission to enable themselves to be added to the users list of friends. As also described below, this functionality enables an email to be generated and delivered to the user on a condition that one of the user's friends 609 has purchased tickets to a product included in the user's watchlist.

If the user selects hourly, (for example, in the case of an auction), daily, weekly, or monthly, the watchlist is emailed to them on the selected periodic basis. In contrast, the "upon changes" selection permits the user to receive an emailed watchlist when some aspect of the watchlist has changed, as is shown in FIG. 7. The "other" option permits the user to select when the want to me notified, including a specific periodicity, selected dates, or specific times or occasions.

Referring to FIG. 7, the watchlist as shown is emailed in response to the "upon changes" selection, and the watchlist indicates two changes: a change to the price of the first item (ticket to the movie The Hunger Games), and an additional available upgrade of the second item (e.g. backstage passes to the Bruce Springsteen concert). The user may take action by buying one of the items on the watchlist or deleting one of the items, or may take no action.

It should be noted that the user may create a plurality of different watchlists. For example, the user may create a movie watchlist comprising a plurality of movies, a travel watchlist comprising various hotel reservations, cruises, flights, etc., a dining watchlist with various dining reservations, and/or a relaxation watchlist with various spa services, etc. All of these watchlists may be independently created, configured and emailed to the user.

The auto search feature shown in FIG. 6 permits the system 100 to automatically search the website for items that are similar to the items that the user selects for placing on their watchlist. The user may be notified separately of these additional items via email or via a separate section of the watchlist. The system 100 suggests other similar alternatives to the user and asks the user for permission to add these items on their watchlist.

The auto add feature shown in FIG. 6 goes one step further than the auto search feature, in that it automatically adds the similar items to the website without prior authorization from the user. As would be understood by those of skill in the art, additional limitations may be set in place as shown in FIG. 6 to ensure that too may additional items may not be added. By way of illustration, a limitation of 2 additional similar items per selected item, or 5 additional items overall may be set by the user. The list of friends 609 also described above in connection with FIG. 6 enables a user to receive emails notifying the user when one of his/her friends purchases tickets to a product included in the user's watchlist. The list of friends 609 may be configured such that certain friends are associated with certain products within the user's watchlist. For example, the user may wish to know if Jay purchases tickets to a sporting event but not a movie.

Figure 8:
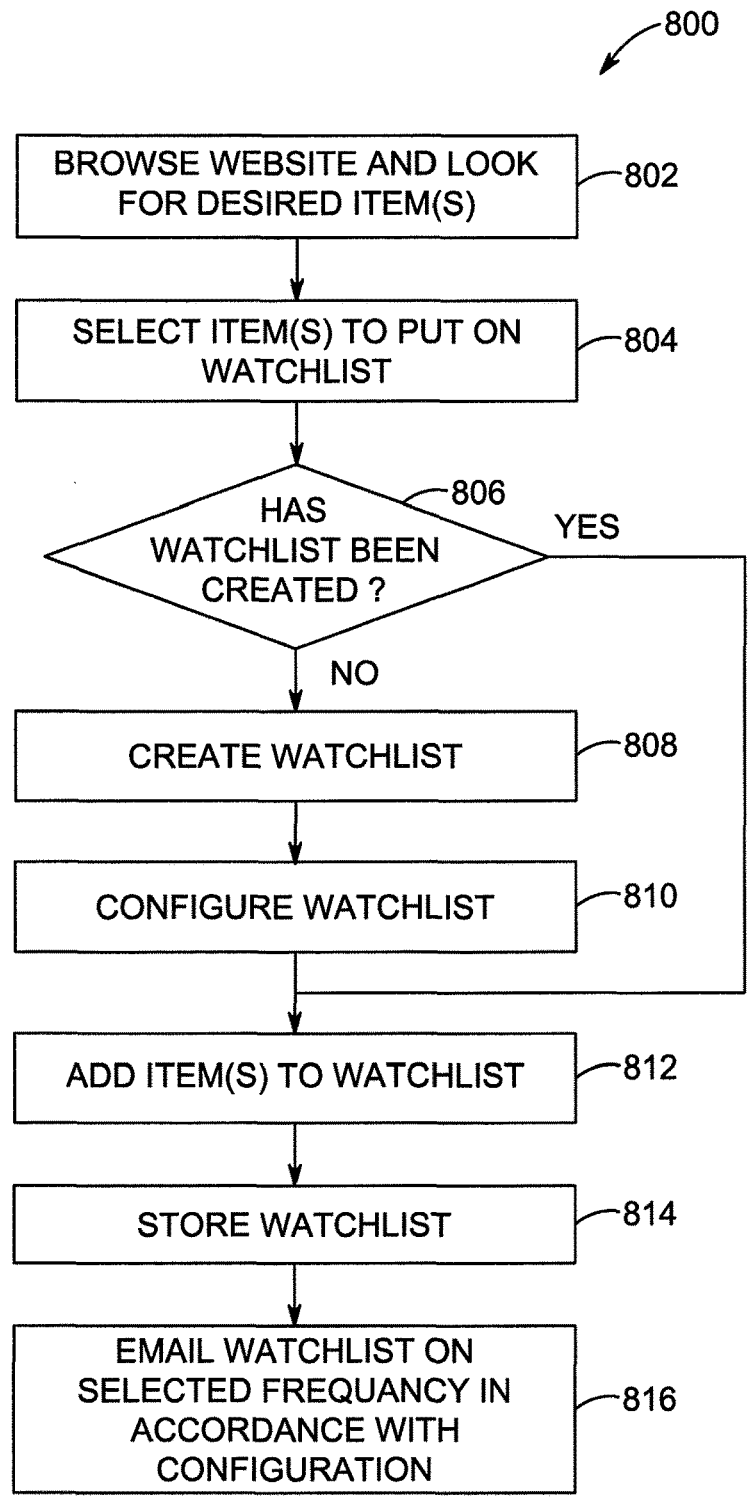
FIG. 8 is a flow diagram of a method in accordance with the present invention.

The method of this embodiment is shown with reference to FIG. 8. The user browses the selected website and searches for desired items (802). The user selects the desired item(s) to put on their watchlist (804). A determination is made to see if a watchlist was already previously created (806). If a watchlist has not been created, a watchlist is created, the user configures the watchlist in accordance with their preferences, and the item(s) are put on the watchlist (808, 810, 812). It should be noted that step 806 may be optional in that default setting may be used to create a watchlist. Therefore, in this alternative embodiment, the watchlist is automatically created by the e-commerce system 100 when a first watchlist item is added.

If the watchlist was already created, the method skips to the step of putting items on the watchlist (812). The watchlist is then stored (814). The watchlist is then emailed to the user on the frequency selected during the user's configuration of their watchlist, or on a default frequency or setting (816).

It should be understood by those of skill in the art that the present e-commerce system 100 is flexible to utilize in a variety of different manners. In one example, a user may put one or more items that have a limited quantity or limited availability duration. If a website provides quantity or availability duration information along with the other information provided about an item, the user may also put such an item on their watchlist for tracking. One such example may be movie tickets for a particular movie at a particular time. The user may put such an item on their watchlist, and as either the movie time approaches, or the tickets are within a predetermined number of tickets from becoming sold out, the user may be notified by receiving the transmitted watchlist with the updated information. In another embodiment, the user may be notified regarding how fast (or slow) tickets are being sold for an event on their watchlist. For example, where an available amount of tickets reduces from say for example 90% to 30% in say for example 30 minutes, the system is able to be configured either by the system operator or by the user to generate and send an email informing the user of this fact. Similarly, the system may be configured by either the system operator or the user to trigger an email alert when an available amount of tickets drops to say 20% (or any percentage). Furthermore, either the system operator or the user may configure the system to combine these two features together. For example, the system may be configured by either the system operator or the user to generate an email to the user when the amount of available tickets drops to say 20% with an override wherein am email will also be generated in the event that the tickets are selling particularly fast. The override may be triggered in any appropriate manner such as dropping from one percentage of availability to another within a predetermined time frame or, for example, a rate of tickets sold per time (e.g. 5000 tickets sold in first hour of availability or over the course of some predetermined time frame). As described above, the watchlist may also be configured to include links to friends such that an alert may be provided on a condition that one of the user's friends has purchased tickets to an event on the user's watchlist.

Likewise, a user may put items on their watchlist that are not yet available, such as show, concert or sporting event tickets. Once these tickets become available the user may be notified via the parameters set forth on their watchlist.

Figure 9:
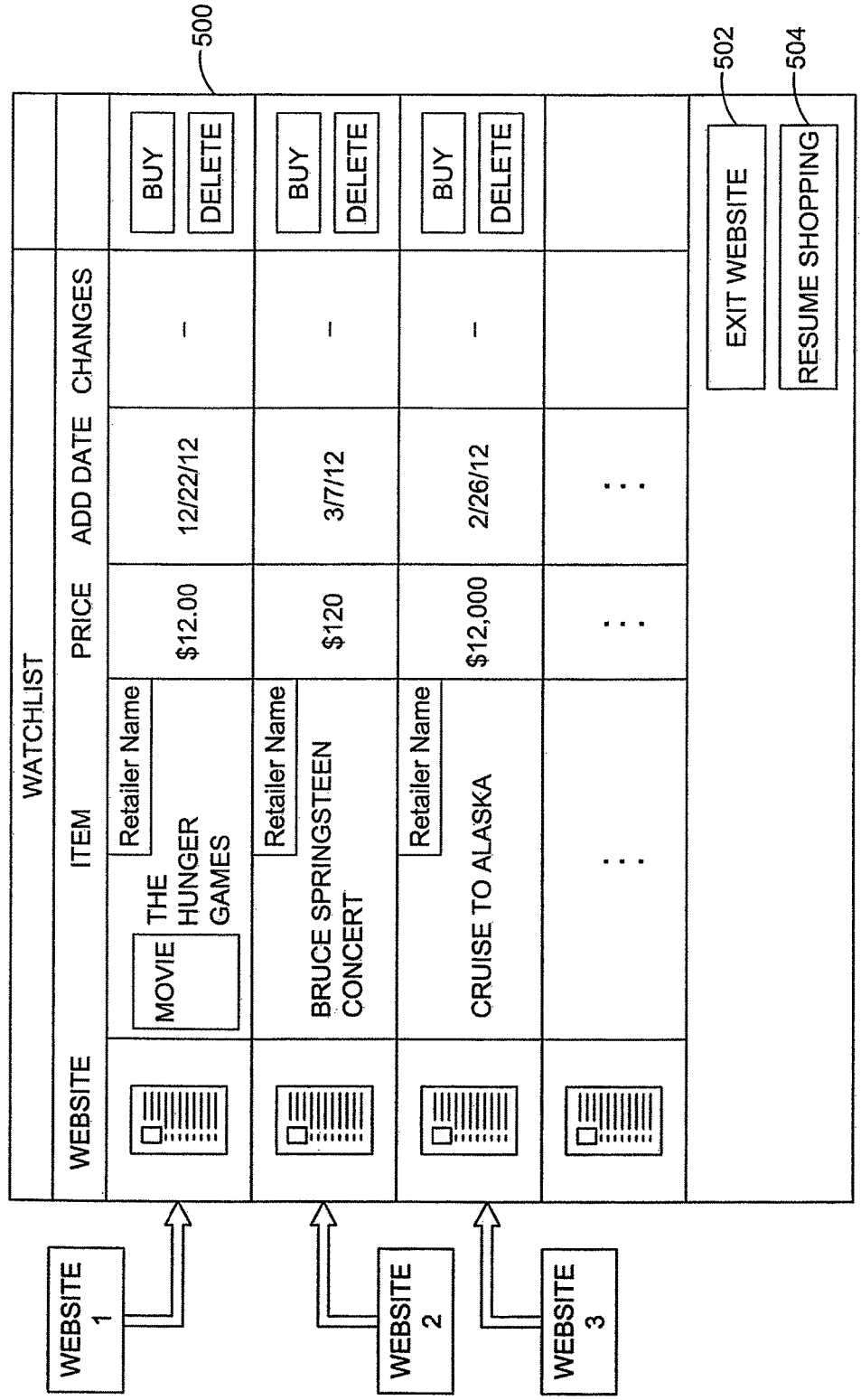
FIG. 9 shows a second embodiment for adding items to a watchlist from a plurality of websites

Referring to FIG. 9, a second embodiment is shown. This embodiment is similar to the aforedescribed embodiment of FIGS. 1-7, except that the watchlist of this embodiment may be generated from items on a plurality of websites. Each of the watchlist items may be from different websites as is graphically illustrated in FIG. 9. The user may browse a plurality of websites wherein as the user browses the websites, and selects one or more items, these items are placed in their one or more watchlists.

This functionality provides the user with exceptional convenience in tracking a plurality of items over a plurality of websites in a single, central location, while receiving updates regarding those items in a manner in which the user has selected.

There are at least two alternatives for permitting items from multiple websites to be added to a watchlist; a first alternative captures the information of an item that the user wants to place on their watchlist from the particular website, and stores this information in the e-commerce system 100; and the second alternative utilizes functionality (called WOW, for "widget on a website") at each website to communicate with the e-commerce system 100 and transmit this information and any updated information to the e-commerce system 100. These two alternatives will be explained in detail hereinafter.

In the first alternative, the user browses one or more websites, and when they have identified an item that they want to add to their watchlist, they perform a "screen capture", on the particular item. This information must be saved, and then later pasted into an email or a screen of the e-commerce system 100. The screen is scrubbed for all relevant information and added to the watchlist. The e-commerce system 100 may then periodically send out one or more web crawlers to update this information on a basis as set forth by the user. One of skill in the art would appreciate that this alternative may meet with mixed results depending upon the information that is available on each website.

In the second alternative, the WOW functionality is included on each "participating" website. A participating website is a website that has incorporated WOW functionality, that will automatically transmit the desired information directly to the e-commerce system 100. This permits the information for adding to the watchlist to be seamlessly added and also seamlessly updated as selected by the user.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Figure 10:
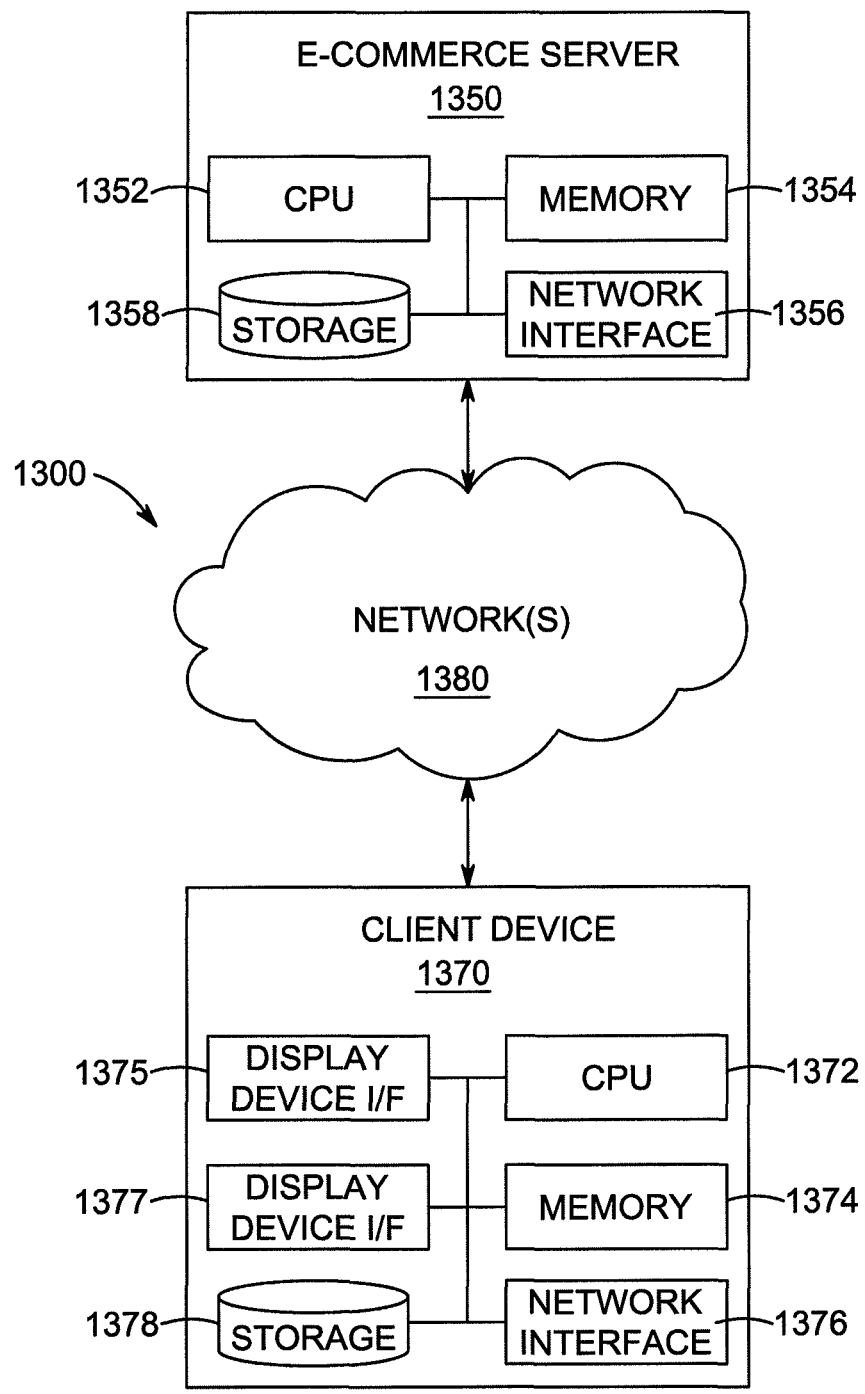
FIG. 10 shows an example system that may be used to implement features described herein with reference to FIGS. 1-9.

FIG. 10 shows an example system 1300 that may be used to implement features described above with respect to FIGS. 1-9. The example system 1300 includes an e-commerce server 1350, a client device 1370, and one or more networks 1380.

The e-commerce server 1350 may include at least one processor 1352, memory device 1354, network interface 1356, and storage device 1358. The client device 1370 may include at least one processor 1372, memory device 1374, network interface 1376, input device interface 1375, display device interface 1377, and storage device 1378.

The e-commerce server 1350 may be configured to perform any feature or combination of features described above with reference to FIGS. 1-9 as performed by the account management module 102, database module 104, order execution module 108, message processing module 110, and/or email interface module 112. The client device 1370 may be configured to perform any feature or combination of features described above with reference to FIGS. 1-9 as performed by the email client module 122 and/or the web browser module in the customer client device 120. The client device 1370 may be, for example, a desktop computer, a laptop computer, a netbook, a tablet computer, a personal digital assistant (PDA), a cellular phone, or any other appropriate device.

Each or any of the memory devices 1354, 1374 may be or include a device such as a Dynamic Random Access Memory (D-RAM), Static RAM (S-RAM), or other RAM or a flash memory. Each or any of the storage devices 1358, 1378 may be or include a hard disk, a magneto-optical medium, an optical medium such as a CD-ROM, a digital versatile disk (DVDs), or Blu-Ray disc (BD), or other type of device for electronic data storage. The storage device 1358 in the e-commerce server 1350 may store the information or any subset of the information described above with reference to FIGS. 1-9 as stored in the e-commerce database 106.

Each or any of the network interfaces 1356, 1376 may be, for example, a communications port, a wired transceiver, or a wireless transceiver. Each or any of the network interfaces 1356, 1376 may be capable of communicating using technologies such as Ethernet, fiber optics, microwave, xDSL (Digital Subscriber Line), Wireless Local Area Network (WLAN) technology, wireless cellular technology, and/or any other appropriate technology. The network interfaces 1356, 1376 may be used by the e-commerce server 1350 and/or the client device 1370 to communicate via the one or more networks 1380. The network interface in the e-commerce server 1350 may be configured to communicate any of the messages and/or other information described above with reference to FIGS. 1-9 as communicated by the account management module 102, database module 104, order execution module 108, message processing module 110, and/or email interface module 112. The network interface 1376 in the client device 1370 may be configured to communicate any of the messages and/or other information described above with reference to FIGS. 1-10 as communicated by the email client module 122 and/or by the web browser module in the customer client device 120 used for communicating with the account management module 102.

The one or more networks 1380 may include one or more private networks and/or one or more public networks such as the Internet. The one or more networks 1380 may be based on wired and/or wireless networking technologies.

The input device interface 1375 in the client device 1370 may be an interface configured to receive input from an input device such as a keyboard, a mouse, a trackball, a scanner, a touch screen, a touch pad, a stylus pad, and/or other device. The input device interface 1375 may operate using a technology such as Universal Serial Bus (USB), PS/2, Bluetooth, infrared, and/or other appropriate technology. The input device interface 1375 may be configured to receive any or any combination of the user input described above with reference to FIGS. 1-9 as received by the by the email client module 122 and/or by the web browser module in the customer client device 120 used for communicating with the account management module 102.

The display device interface 1377 may be an interface configured to communicate data to a display device (not depicted). The display device interface 1377 may operate using technology such as Video Graphics Array (VGA), Super VGA (S-VGA), Digital Visual Interface (DVI), High-Definition Multimedia Interface (HDMI), or other appropriate technology. The client device 1370 may include or be connected to a display device (not depicted) via the display device interface 1377. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received via the display device interface 1377, any display elements described above with reference to FIGS. 1-9 as displayed by the email client module 122 and/or by the web browser module in the customer client device.

The memory device 1354 and/or the storage device 1358 of the e-commerce server 1350 may store instructions which, when executed by the at least one processor 1352, cause the at least one processor 1352 to perform any feature or combination of features described above with reference to FIGS. 1-9 as performed by the account management module 102, database module 104, order execution module 108, message processing module 110, and/or email interface module 112. The memory device 1374 and/or the storage device 1358 of the client device 1370 may store instructions which, when executed by the at least one processor 1372, cause the at least one processor 1372 to perform any feature or combination of features described above with reference to FIGS. 1-9 as performed by the email client module 122 and/or by the web browser module in the customer client device 120 used for communicating with the account management module 102.

Although FIG. 10 shows a single e-commerce server 1350 and a single client device 1370, the functionality described above with reference to FIG. 10 as performed by the e-commerce serve 1350 and/or the client device 1370 may be distributed across any number of devices that possesses similar characteristics and/or that include similar components 1352, 1354, 1356, 1358, 1372, 1374, 11375, 1376, 1377 as the e-commerce server 1350 and/or the client device 1370.

While examples are provided above with respect to the Figures which includes the use of email communications, the features described above with respect to the Figures may also be implemented using different types of communications technology. For example, the features described above with reference to the Figures may also be implemented, mutatis mutandis, using technologies that include any one or any combination of: email; instant messaging; enterprise messaging; Short Message Service (SMS); Multimedia Messaging Service (MMS); and/or any other appropriate technology for the electronic communication of data.

As use herein, the term "vendor" broadly refers to and is not limited to a business, a non-profit organization, any other type of organization, and/or an individual person. One example of a business is an online retailer. Examples of non-profit organizations include charitable organizations, educational institutions such as schools and universities, arts organizations, and recreational organizations. Examples of recreational organizations include historical or preservation societies, local recreational sports leagues.

As used herein, the term "processor" broadly refers to and is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described above with reference to the Figures may be used alone without the other features and elements or in various combinations with or without other features and elements. Sub-elements of the methods and features described above with reference to the Figures may be performed in any arbitrary order (including concurrently), in any combination or sub-combination.

What is claimed is:

1. A computer system that utilizes Simple Mail Transfer Protocol (SMTP) to facilitate electronic commerce (e-commerce), the system comprising:

a network interface that is communicatively coupled to a vendor website via a network;
a memory that stores information including:
  user specific information including at least an email address,
  financial information associated with the user,
  shipping address information of the user,
  billing address information of the user and
  a watchlist including at least two items selected by the user, each item comprising associated information;
a processor communicatively coupled to the network interface and the memory, wherein the processor:
determines a plurality of email addresses associated with the user,
sends, using the network interface, at least one web crawler to update the associated information;
automatically searches websites, using the network interface, for items similar to the at least two items,
automatically adds the similar items to the watchlist up to a user set limit;
automatically sends, using the network interface, a SMTP email message including a mailto link to the email address of the user upon changes in the watchlist based on the associated information that is updated,
determines that one of said at least two items were purchased by at least one person associated with one of said plurality of email addresses,
automatically sends a second SMTP email to the user when one of the at least two items were purchased by at least one person associated with one of said plurality of email addresses, and
receives, using the network interface, updated information from a widget on vendor website to update the watchlist.

2. The system of claim 1, wherein the watchlist is formed based on a particular item selected by the user via a user interface.

3. The system of claim 1, wherein the at least two items selected by the user are selected via an email sent to the user.

4. The system of claim 1, wherein items added to the watchlist are added from a single website.

5. The system of claim 1, wherein items added to the watchlist are added from multiple websites.

6. The system of claim 1, wherein items are added to the watchlist by the processor.

* * * * *